INVENTOR:
REUBEN H. HORTON
ATTORNEY

Patented Mar. 9, 1943

2,313,439

UNITED STATES PATENT OFFICE 2,313,439

POWER AND HEATING SYSTEM

Reuben Harland Horton, Philadelphia, Pa., assignor to Edward G. Budd Manufacturing Company, Philadelphia, Pa., a corporation of Pennsylvania Application May 26, 1938, Serial No. 210,142

13 Claims. (Cl. 257—3)

This invention relates to heating, power and lighting plants and particularly to plants employing prime movers adapted to drive an electrical generator while developing considerable waste heat capable of conversion into space heating.

More particularly the invention has evolved in the form of a self-contained unit employing a Diesel engine prime mover adapted and arranged for rail car heating, powering and lighting, although it will obviously appear that other adaptations and applications may be found especially suited to the system of the present invention aside from the rail car field, where efficiency and independence of operation are sought.

Rail car heating and lighting in the past has generally lacked independence for each car unit to a greater or lesser extent, since the usual source of power was that diverted from the locomotive. Heating and lighting of each individual car sapped as much as fifty to seventy-five horse power from the drawing locomotive's available horse power, resulting in five hundred to seven hundred fifty horse power for the usual ten car train, losses of this sort cause train schedule delays in cold weather, make expensive steam connections to the locomotive necessary, and with the advent of air conditioning has not even relieved the locomotive of this load during the warmer seasons. The load further cuts down the number of useful cars a given locomotive can haul. In addition, heating and air conditioning provisions for uncoupled cars at terminals have been necessary together with maintenance crews to couple and uncouple steam train pipes and air conditioning conduits, and expensive efforts have been made to avoid waste of a costly form of heat.

In addition, each car carries a heavy storage battery equipment adequate to supply lighting and auxiliaries over extended periods of rest, which require frequent replacement and servicing.

This invention more specifically relates to the use of a wholly independent unit in conjunction with each rail car, containing a prime mover preferably of the Diesel oil burning type, coupled to an electric generator, and combined with heating means employing to the fullest possible extent the waste heat of the Diesel engine, as well as electric heat from the generator, whereby an overall efficiency of 90% may be attained in the development of all possible heat and power from the fuel oil burned. The invention further has to do with the control means and various arrangements whereby reliability, ruggedness and satisfactory operation are assured over the wide ranges of service to which the apparatus would be subjected.

Accordingly, an object of the invention is to provide a self-contained heat, power and lighting unit for rail car use which will be independent in operation from movement of the car and which with great efficiency will supply the heating, lighting and power requirements of each individual car.

A further object of the invention is to provide a self-contained unit for heating, air conditioning and lighting a rail car which will be lighter than the usual motion operated electric storage battery and generator plants, have greater capacity and be completely independent of any outside heating or energy source.

Another object of the invention is to provide a self-contained unit for rail car heating, lighting and air conditioning employing an internal combustion engine of the oil burning type so arranged as to employ the waste heat for supplying the water heating and air heating and conditioning requirements of the car while employing generated electrical energy for heating, lighting and powering the various auxiliaries incident to such installations.

Yet another object of the invention is the provision of a reliable heating and power unit which will impose no drag load upon the locomotive, render it unnecessary for the locomotive to supply heat and in turn be lighter and more efficient than systems heretofore known.

Still another object of the invention is the provision of an independent power equipment capable of supplying energy for air conditioning at low expense, and provide all the reheat necessary as a waste by-product.

The above and many other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference characters indicate like parts:

Figure 1:
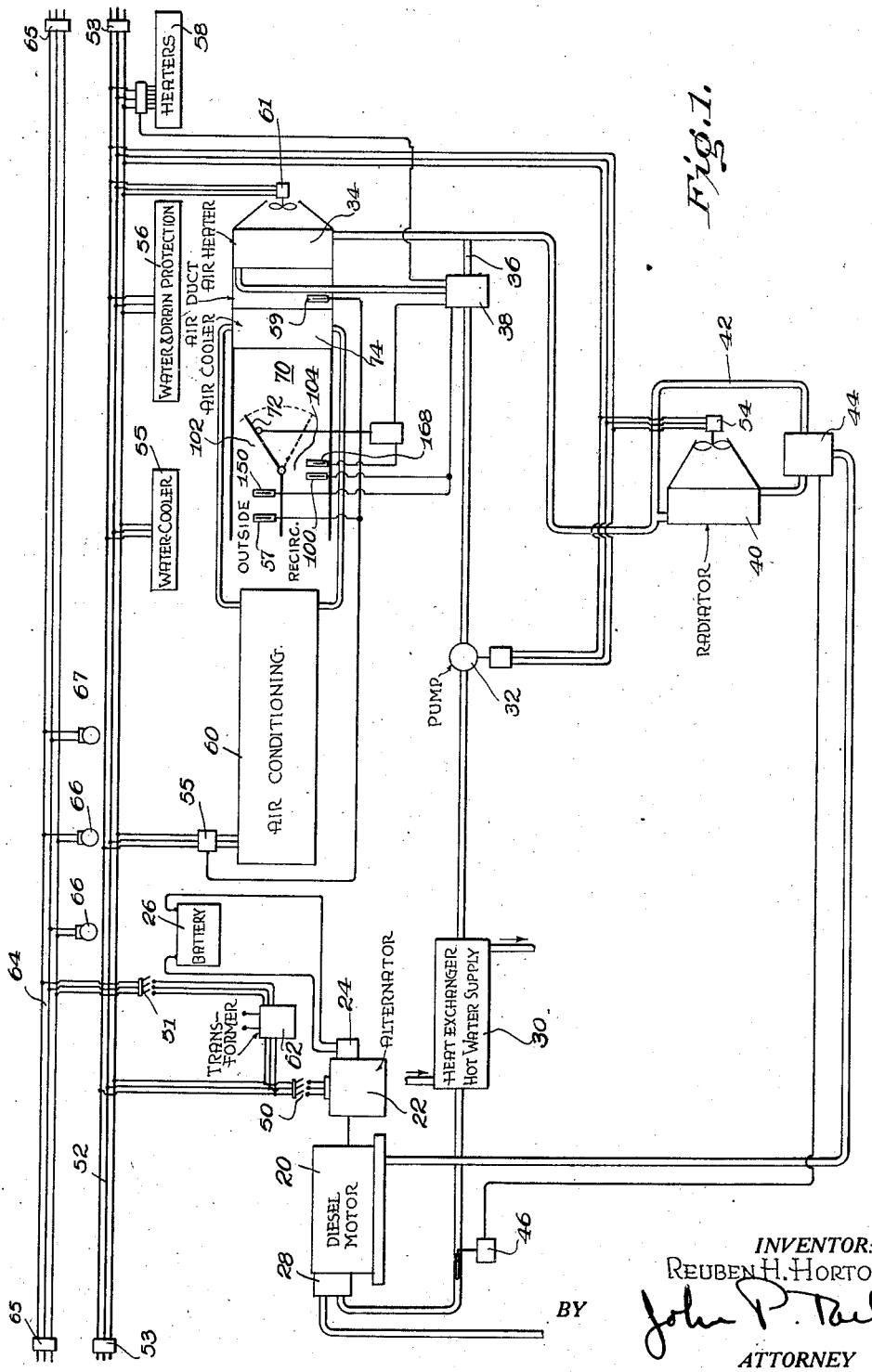
Fig. 1 is a diagrammatic illustration of the general apparatus arrangement.

Referring to the drawings and more particularly to Fig. 1, there is shown a Diesel motor 20 adapted to run at a constant speed drivably connected to a three phase alternator 22, and an exciter 24, the latter being connected to a storage battery 26, which may in practice be employed for starting.

The water jacket of the Diesel motor is connected in a circulatory system to a heat exchanger and exhaust manifold cooler 28 to absorb waste heat from the exhaust gases, a heat exchanger 30 for instantaneous hot water heating for lavatory use, to a pump 32 for providing rapid circulation, an air heating coil 34 having a bypass 36 and a proportioning valve 38 for varying the amount of bypassing, a cooling radiator 40, also provided with a bypass 42 and a proportioning valve 44, and thence back to the water jacket.

In the outlet 46, a thermostat is placed which controls the proportioning valve 44 so as to maintain the temperature of the cooling water leaving the jacket and exhaust manifold cooler 28 at a fixed temperature this being accomplished by bypassing more or less fluid through the bypass 42, or through the cooling radiator 40.

The alternator is connected through a line switch 50 to the car power line 52 from which are driven a cooling radiator circulating fan 54, the water pump 32, a water cooler 55 for drinking purposes, heating elements 56 for water and drain pipe protection against freezing in cold weather, electrical space heaters 58, an electrically driven refrigeration unit for air conditioning 60 and an air circulatory blower 61.

From a transformer 62, a lighting line 64 is energized having lights 66 or other suitable connections for appliances 67, such as cooking, etc. as will be readily understood in the art, and the voltage thereof may be 110 or 32 or such other voltage as may be found desirable.

To heat and air condition the car enclosure, an air duct 70 is provided having a damper 72 for controlling the amount of recirculated air or entering fresh air, a refrigerating coil 74 connected to the refrigerating unit 60, and the air heating coil 34, so arranged as to be adapted to reheat the air after it passes through the refrigerating unit. The blower 61 draws the air through the coils 74 and 34 and distributes the same throughout the enclosure.

In practice, the water cooler 55, cooling radiator fan 54, blower 61, and the pump 32 provide a steady minimum load upon the alternator and thus the Diesel is kept under a partial load and provides a certain amount of steady minimum heating capacity from the cooling fluid. The pump is adapted to circulate the cooling fluid at a rapid rate and preferably so that there is never a temperature differential of more than 15° and preferably less between the fluid leaving the motor and that returning to it. Such rapid circulation permits the temperature control to be placed on the out flow side of the engine, so that liquid is always delivered to the air heater 34 at a uniform temperature except for such change as may be effected by the hot water heat exchanger. In practice, however, the flow is so rapid that with maximum lavatory hot water flow requirements, only a few degrees temperature differential results from the heat exchanger 30. Also with such a rapid flow, the mean temperature in the air heater coil 34 is maintained high and within a few degrees of the maximum thereby requiring a small coil, and the cooling radiator 40 is rendered more efficient for its size, so that all in all the advantages gained from the high fluid circulation rate are manifold.

While the thermostatic control over the circulating water temperature can be placed in most any part of the system in order to maintain a uniform motor temperature, as well as a uniform fluid temperature which will give an even source of heat and therefore easier to control, the water temperature control is best placed in the position shown, and, thus, as the outflow temperature goes above normal, more radiator cooling is promptly cut in by operation of valve 44, and as the outflow temperature goes below normal, promptly the fluid bypassed at 42 is increased, so that with the rapid circulation, prompt and efficient control is maintained.

In practice the valve 44 is operated mechanically from the thermostat 46 to effect a uniform temperature output as will be well understood in the art.

Control over the remainder of the heating and air conditioning apparatus may be effected in a variety of different ways. Various thermostatic or humidostatic devices may be employed as will be readily understood by those skilled in the art. However, a simplified form of satisfactory control is also diagrammatically illustrated in Fig. 2.

As has previously been described, various electric devices which operate more or less continuously throw a steady minimum load on the alternator and Diesel motor, which results in the more efficient operation of the motor from the "overall" standpoint, that is, fuel oil consumed as compared to the crankshaft horse power delivered to the alternator plus the waste water jacket and exhaust manifold heat which in the present instance is employed for heating purposes.

Since the steady minimum load produces a certain amount of waste heat, one of the features of the invention is the complete use of the waste heat, prior to the use of any electric heat. The waste heat generally under the light load operation is sufficient to take care of all the lavatory hot water requirements and supply the necessary tempering reheat necessary in the air conditioning, and all without substantial cost, since the source is usually considered waste from an otherwise efficient and economical source of electrical energy. In the winter time, when this source of waste heat under light load becomes insufficient, then additional electrical heating load is resorted to which in turn increases the recoverable waste heat because the engine burns more fuel.

Figure 2:
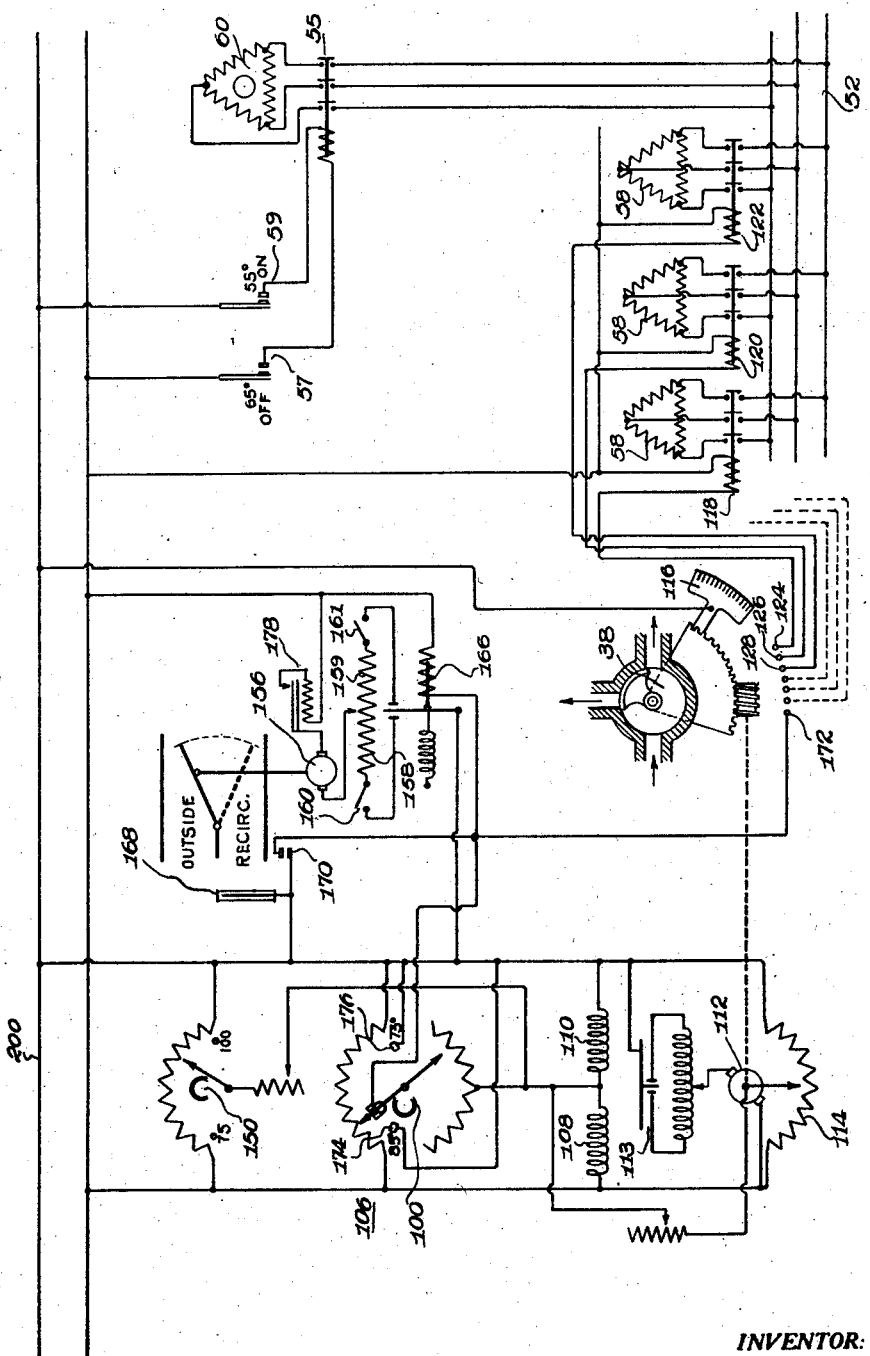
Fig. 2 is a diagrammatic illustration of one form of suitable control mechanism therefor.

Control over the system may be simply effected through an arrangement, diagrammatically illustrated, in Fig. 2.

Energy for control purposes may be taken from any of the sources, the battery, the power line 52 or the light line 64, and is connected to a control bus 200. Thermostats 150, and 100 located in the outside air duct 102 and recirculating or inside air duct 104 respectively are arranged to operate in a potentiometer bridge circuit 106 whereby the inside air temperature is compensated through a range from 75° to 85°, to correspond to the outside or ambient temperature range of 75° to 100°. Upon proper temperature conditions inside and out, the bridge circuit balances, motor relay coils 108 and 110 are equally energized, and motor controller 112 is stationary. Should either outside or inside temperature change, in a non-compensating manner, to unbalance the bridge, one or the other relay coils is energized to operate the reversing switch 113 to cause the motor to rotate in one direction or the other, and its rotation is modulated by the motor operated potentiometer 114 so that correction is effected in a gradual fashion. The foregoing apparatus is well understood in the prior art specially in its broad use, to which use it has been put herein. In brief, it is a compensated temperature responsive device for controlling a source of heat.

The motor controller is adapted to operate the valve 38 and thus open or close the bypass to decrease or increase the heat sent to the heating coil 34 and after the valve has reached a wide open position for maximum heat, it is permitted to overrun for the purpose of operating a fan switch 116 which by further movement connects in sequence one or more electrical heating units 58 by energizing control switches 118, 120, 122, etc. through the fan switch and associated contacts 124, 126, 128, etc.

In practice as many as six steps or even more may be employed, so that various stages of control are effected. It will be understood, of course, that as each heating unit is loaded on the generator 22, more fuel oil is burnt to maintain the Diesel engine operating at substantially constant speed, and hence more waste heat becomes available.

Refrigeration is controlled through a starting relay 55 by a thermostat 59 set to maintain air cooling to a temperature of 55°, and a thermostat 57 in the outside air duct is adapted to cut off refrigeration when the outside temperature drops below 65°. By cooling to 55° and reheating with waste Diesel motor heat, a comfortable air condition may be readily maintained, and a proper amount of moisture removed from the air.

While standard railway practice demands a maximum amount of fresh air at all times to prevent the air from fouling as might occur with heavy passenger loads, yet under certain weather conditions, it is impractical to provide heating equipment and air conditioning equipment to take care of extreme conditions. Since in cold weather warmth is paramount, a damper 72 is provided to cut down outside air to as little as 25% when the entire heating capacity of the system proves inadequate, or when the humidity becomes greater than 60%, or should the car temperature exceed 85° as in extremely hot weather.

Damper control is effected through a damper motor 156 having opposed fields 158 and 159 for reverse operation, with limit switches 160 and 161 for cutting the corresponding field circuit when the damper reaches one or the other of its limits of movement. In practice, the damper is set to vary the percent of recirculated air from 25° to 75° of the total, and the limit switches may be set accordingly. A relay controlled reverse switch 164 is adapted to set the motor in operation either to close off outside air, or close off recirculated air depending upon whether the relay solenoid 166 is energized or not. Various arrangements for energizing the relay may be provided. The humidostat 168 may cause the damper to close by closing the contacts 170 upon an increase in humidity in the recirculating air duct above 60%. Thus the refrigeration coil will act on a smaller body of air and will be able to reduce the humidity. The fan switch 116 may be provided with an end contact 172 which will close the damper when all the heat capacity of the electrical heaters and the waste heat become insufficient. In addition, the thermostat 100 may have a pair of end contacts 174 and 176 in parallel with the humidostat contacts 170 and fan switch contact 172, so that if the temperature should fall to 73°, or exceed 85°, the damper will be caused to close. In order to slow down the opening or closing movement of the damper, an integrating thermal time switch 178 may be employed in the damper motor circuit 156 so that the motor will operate for brief spaced intervals open, in practice for example every 30 seconds, with a 15 or 20% movement, thus requiring several minutes to close the damper, that is change from 75% fresh air to 25%, or whatever the end adjustments may be.

Throughout the control systems, it will be obvious that limiting stops will be provided as necessary. Further the various thermostatic contacts and control may be adjustable as may seem desirable and the integrating thermostatic periodical circuit breaker and maker switch may also be adjusted for such operation as best suits any particular installation.

In rail car practice as well as other installations, the various parts such as the motor alternator, the battery, the air conditioning apparatus, the cooling radiator and perhaps other parts will be arranged in a separate unitary fashion so that quick removal by merely disconnecting water and fuel pipes and electrical connections for substitution of one or more parts can be readily effected.

It will also appear that on failure of the power unit in one car, the main lines 62 and 64 can be interconnected with adjoining cars by plugs 63 and 65 so as to bleed electrical heating and lighting energy temporarily therefrom. In practice, the lighting line 64 if of 32 volts can be connected to present day standard cars so that lighting may be bled from the adjoining storage battery system by connecting two of the phases together where three phase and shunting-out one phase, which latter phase might include all the small apparatus which otherwise would not operate on direct current. Such shunted phase might be indicated as at 67. Under such circumstances, the switch 51 will be opened to isolate the line from the remainder.

The operation of the system should readily appear from the foregoing description, but for a clear understanding a brief description follows. The Diesel engine driving the generator and certain steady connected devices generates waste heat in its exhaust and water jackets, which heat is rapidly circulated by the pump 32 through the heating coil 34 and lavatory water heat exchanger 30. The amount of heat to be extracted for heating air is arranged to depend upon the position of a valve 38 which bypasses the unused portion. Even temperature is maintained by employing such auxiliary radiation 40 as may be necessary to maintain the water temperature at 46 constant, for example 175°, and for this purpose the valve 44 bypasses certain amounts of the liquid around the radiator as may be necessary. The circulation is maintained so rapid that temperature differentials throughout the system are extremely small.

The control of the heat supplied to the coil 34 depends on the setting of the thermostats 150 in the fresh air duct and 100 in the return air duct, and is in sufficient amount to reheat the 55° air coming from the cooling coil 74.

Whenever the hot water heat is insufficient to satisfy requirements, then one or more electrical heating units are switched in by the motor controlled valve 38 and switch 116 loading the Diesel motor and producing more waste water heat as well as electrical heat, but the waste heat is utilized as before in the heating coil 34, since the incoming air is cooler and cooler as more heat is required and furnished.

When the incoming fresh air drops below 65°, the refrigeration is cut off by thermostat 57. When all the electrical heaters are operating and there is still insufficient heat, the switch 116 moves to its extreme position and contact 172 which causes the damper to cut down on the outside air intake. On the other hand, if during hot humid weather, the relative humidity should rise above 60%, humidostat 168 and contacts 170 will close and again the damper will cut off sufficient outside air to bring the capacity of the apparatus and the amount of fresh air and recirculated air to a proper balance to properly heat the enclosure.

Thus there is provided an independent power, lighting, heating and air conditioning plant of extremely high efficiency, and one capable of easy control to satisfy rapidly varying conditions. While the arrangement has been particularly designed for rail car use, where wide variations in weather conditions are met, as in trains travelling north and south in winter months, yet it will be obvious to those skilled in the art that the apparatus is capable of general use to supply independent power, heat, light and air conditioning wherever desired.

Though only a single diagrammatic embodiment of the invention has been shown and described, it is to be understood that the invention is not limited to the specific arrangement shown but may be embodied in various mechanical forms and arrangements. For example the size and capacity of the apparatus may be varied at will; the source of energy, disclosed as a Diesel engine may of course be changed to any internal combustion engine, or in fact any prime mover affording power for generation and waste heat. Various changes and substitutions in the control system may be employed, it merely being necessary that certain essentials hereinbefore made apparent and hereinafter claimed, be met. As such and many other changes in construction, arrangement and control of parts may be made without departing from the spirit of the invention, as will be apparent to those skilled in the art, reference will be had to the appended claims for a definition of the limits of the invention.

What is claimed is:

1. A heating, lighting and power system comprising an internal combustion engine, a generator driven thereby, a water jacket for the engine and its exhaust gas conduit, an enclosure air heating device connected to said water jacket, a thermostatically controlled bypass around said heating device, a cooling radiator remote from said enclosure in circuit with said jacket and heating device, and a thermostatically controlled bypass around said radiator, said last named thermostatically controlled bypass being responsive to the temperature of the water leaving or entering said jacket.

2. An air conditioning, heating, lighting and power system comprising an internal combustion engine, a generator driven thereby, a water jacket for the engine and its exhaust conduit, an enclosure air heating device connected to said water jacket, electrical resistor heating and radiating units arranged for radiation in said enclosure, means for circulating water from said jacket to said device in amounts varying with enclosure temperature and means for connecting said electrical heating units to said generator in varying degree and in response to enclosure temperature changes, said electrical heating units being connected when the amount of water circulating through siad device becomes a maximum.

3. A heating, lighting and power system comprising an internal combustion engine, a generator driven therefrom, means for heating an enclosure with the waste heat of said engine, means for directly heating said enclosure electrically, an electric circuit including said electrically heating means and said generator in series, switch means for closing and opening said circuit to respectively energize and deenergize said electrically heating means, means for varying the supply of waste heat medium from said engine to said first means, and thermostatic means for controlling said varying means in accordance with the demand for enclosure heating and for effecting closure of said switch means only after the supply of waste heat medium is at a maximum.

4. A heating, lighting and power system comprising an internal combustion engine, a generator driven thereby, cooling means for said engine comprising a water jacket, an enclosure air heater, a cooling radiator, and means for rapidly circulating a heat exchanging medium therethrough, a heat exchanging medium bypass around said enclosure air heater and enclosure temperature responsive means for controlling the extent of bypassed medium, a heat exchanging medium bypass around said cooling radiator, and medium temperature controlled means for controlling the extent of medium bypassed therearound.

5. A heating, lighting and power system comprising an internal combustion engine, a generator driven thereby, cooling means for said engine comprising a water jacket, an enclosure air heater, means for dissipating heat remote from said enclosure and a cooling medium therein, and electro-magnetic valve means connected to said generator for diverting cooling medium from said air heater to said dissipating means, thermostatic means responsive to enclosure temperature for controlling said diverting means, and means including thermostatic means responsive to cooling medium temperature for varying the effectiveness of said heat dissipating means.

6. A heating, lighting and power system comprising an internal combustion engine, a generator driven thereby, cooling means for said engine comprising a water jacket, an enclosure air heater, means for dissipating heat remote from said enclosure and a cooling medium therein, and electro-magnetic valve means connecting to said generator for diverting cooling medium from said air heater to said dissipating means, thermostatic means responsive to enclosure temperature for controlling said diverting means, means including thermostatic means responsive to cooling medium temperature for varying the effectiveness of said heat dissipating means, and means for circulating said cooling medium rapidly to maintain the temperature differential less than 30° F.

7. The method of supplying heat, light and power to an enclosure which comprises operating an internal combustion engine and driving a generator therefrom, partially heating the enclosure from electrical energy developed by said generator, cooling said engine by circulating water therethrough, circulating said cooling water through a heat exchanger to heat said enclosure, dissipating heat from said water in its return to said engine and controlling the extent of dissipation to maintain the water temperature substantially constant at a point of the system.

8. The method of supplying heat, light and power to an enclosure which comprises operating an internal combustion engine and driving a generator therefrom, partially heating the enclosure from electrical energy developed by said generator, cooling said engine by circulating water therethrough, circulating said cooling water through a heat exchanger to heat said enclosure, said circulation being at a rate to maintain a minimum temperature differential in the water throughout its circulation, dissipating heat from said water in its return to said engine and controlling the extent of dissipation to maintain the water temperature substantially constant at substantially the engine discharge point of the circulatory system.

9. The method of supplying heat, light and power from an internal combustion engine driving an electric generator wherein the waste engine heat is employed for heating an enclosure through use of a water circulating and heat radiating system, which comprises circulating the water throughout the system at a rate sufficient to maintain a water temperature differential of less than 30° F., bypassing varying amounts of said water around the enclosure heat radiating portion of the system, thermostatically controlling the amount so bypassed to maintain a desired enclosure temperature, and radiating a sufficient amount of heat remote from said enclosure from said system to maintain the water temperature substantially constant.

10. In an air conditioning system of the type adapted for use on a rail car, an internal combustion engine having a jacket in heat exchange relation therewith for liquid, an air duct, means for moving air through said duct, a heater in said duct having feed and return passages connected with said jacket for the feed of liquid from said jacket to said heater and the return of liquid from said heater to said jacket, respectively, a heat interchanger associated with said return passage for cooling the liquid returning therethrough to said jacket, a pump for circulating liquid through said jacket, feed passage, heater, heat interchanger and return passage, a liquid by-pass around said heater and between said passages and being of at least about the cross-sectional area of one of said passages, a valve in said by-pass including means responsive to the temperature of the air within the car for controlling said valve to by-pass liquid through said by-pass upon rising air temperature, a liquid by-pass associated with said return passage to by-pass liquid around said heat interchanger and being of at least about the cross-sectional area of said return passage, and a valve in said last-named by-pass including means responsive to the temperature of the liquid in said feed passage for controlling said valve to by-pass liquid around said heat interchanger upon falling temperature of the liquid in said feed passage, the cooling of the jacket liquid by the heater together with the cooling of the liquid by said heat interchanger being substantially constant for a given load on said engine.

11. In an air conditioning system of the type adapted for use on a rail car, an internal combustion engine having a jacket in heat exchange relation therewith for liquid, an air duct, means for moving air through said duct, a heater in said duct having feed and return passages connected with said jacket for the feed of liquid from said jacket to said heater and the return of liquid from said heater to said jacket, respectively, a heat interchanger associated with said return passage for cooling the liquid returning therethrough to said jacket, a pump for circulating liquid through said jacket, feed passage, heater, heat interchanger and return passage, a liquid by-pass around said heater and between said passages and being of at least about the cross-sectional area of one of said passages, a valve in said by-pass including means responsive to the temperature of the air within the car for controlling said valve to by-pass liquid through said by-pass upon rising air temperature, a liquid by-pass associated with said return passage to by-pass liquid around said heat interchanger and being of at least about the cross-sectional area of said return passage, a valve in said last-named by-pass including means responsive to the temperature of the liquid in said feed passage for controlling said valve to by-pass liquid around said heat interchanger upon falling temperature of the liquid in said feed passage, the cooling of the jacket liquid by the heater together with the cooling of the liquid by said heat interchanger being substantially constant for a given load on said engine, and a second air heater in said air duct including means responsive to movement of said first-named valve to a position for the circulation of substantially all of the liquid through said first-named heater to render said second heater effective to supply heat to the air in said duct.

12. In an air conditioning system of the type adapted for use on a rail car, an internal combustion engine having a jacket in heat exchange relation therewith for liquid, an air duct, means for moving air through said duct, a heater in said duct having feed and return passages connected with said jacket for the feed of liquid from said jacket to said heater and the return of liquid from said heater to said jacket, respectively, a heat interchanger associated with said return passage for cooling the liquid returning therethrough to said jacket, a pump for circulating liquid through said jacket, feed passage, heater, heat interchanger and return passage, a liquid by-pass around said heater and between said passages and being of at least about the cross-sectional area of one of said passages, a valve in said by-pass including means responsive to the temperature of the air within the car for controlling said valve to by-pass liquid through said by-pass upon rising air temperature, a liquid by-pass associated with said return passage to by-pass liquid around said heat interchanger and being of at least about the cross-sectional area of said return passage, a valve in said last-named by-pass including means responsive to the temperature of the liquid in said feed passage for controlling said valve to by-pass liquid around said heat interchanger upon falling temperature of the liquid in said feed passage, the cooling of the jacket liquid by the heater together with the cooling of the liquid by said heat interchanger being substantially constant for a given load on said engine, a second air heater in said air duct including means responsive to movement of said first-named valve to a position for the circulation of substantially all of the liquid through said first-named heater to render said second heater effective to supply heat to the air in said duct, said air duct having a fresh air intake for outside air and a return air intake for recirculating air from within the car, damper means for controlling the proportion of fresh outside air and recirculated air supplied to said duct, and means for moving said damper means to reduce the proportion of fresh air supplied to said duct after said second-named heater has been unable to raise the temperature of the air to a desired degree.

13. In an air conditioning system of the type adapted for use on a rail car, an internal combustion engine having a jacket in heat exchange relation therewith for liquid, an air duct, means for moving air through said duct, a heater in said duct having feed and return passages connected with said jacket for the feed of liquid from said jacket to said heater and the return of liquid from said heater to said jacket, respectively, a heat interchanger associated with said return passage for cooling the liquid returning therethrough to said jacket, a pump for circulating liquid through said jacket, feed passage, heater, heat interchanger and return passage, a liquid by-pass around said heater and between said passages and being of at least about the cross-sectional area of one of said passages, a valve in said by-pass including means responsive to the temperature of the air within the car for controlling said valve to by-pass liquid through said by-pass upon rising air temperature, a liquid by-pass associated with said return passage to by-pass liquid around said heat interchanger and being of at least about the cross-sectional area of said return passage, a valve in said last-named by-pass including means responsive to the temperature of the liquid in said feed passage for controlling said valve to by-pass liquid around said heat interchanger upon falling temperature of the liquid in said feed passage, the cooling of the jacket liquid by the heater together with the cooling of the liquid by said heat interchanger being substantially constant for a given load on said engine, a refrigerating device in said duct, means for operating said device simultaneously with said heater to dehumidify the air in said duct, said duct having a fresh air intake for outside air and a return air intake for recirculating air from within the car, damper means for reducing the proportion of fresh outside air entering said duct as the temperature or humidity of the outside air increases beyond a predetermined value, and means for suspending operation of said refrigerating device in response to a predetermined low temperature of the outside air.

REUBEN HARLAND HORTON.